United States Patent
Wang et al.

(10) Patent No.: US 11,884,768 B2
(45) Date of Patent: Jan. 30, 2024

(54) METHODS AND COMPOSITIONS FOR FORMING ELASTOMERIC POLYURETHANE ARTICLES AND ASSOCIATED ELASTOMERIC POLYURETHANE ARTICLES FORMED THEREFROM

(71) Applicant: BASF SE, Ludwigshafen am Rhein (DE)

(72) Inventors: Liying Wang, Wyandotte, MI (US); Irina Ternyayeva, Wyandotte, MI (US); Gregory Turco, Wyandotte, MI (US); Zachary Thomas Byrne, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 945 days.

(21) Appl. No.: 16/760,707

(22) PCT Filed: Oct. 18, 2018

(86) PCT No.: PCT/US2018/056503
§ 371 (c)(1),
(2) Date: Apr. 30, 2020

(87) PCT Pub. No.: WO2019/089235
PCT Pub. Date: May 9, 2019

(65) Prior Publication Data
US 2020/0332049 A1    Oct. 22, 2020

Related U.S. Application Data (60) Provisional application No. 62/579,805, filed on Oct. 31, 2017.

(51) Int. Cl.
| | |
|---|---|
| *B29D 35/14* | (2010.01) |
| *C08G 18/10* | (2006.01) |
| *C08G 18/48* | (2006.01) |
| *C08L 75/06* | (2006.01) |
| *C08G 18/42* | (2006.01) |
| *C08L 75/08* | (2006.01) |
| *A43B 13/12* | (2006.01) |
| *C08G 101/00* | (2006.01) |

(52) U.S. Cl.
CPC .............. *C08G 18/10* (2013.01); *B29D 35/14* (2013.01); *C08G 18/42* (2013.01); *C08G 18/48* (2013.01); *C08L 75/06* (2013.01); *C08L 75/08* (2013.01); *A43B 13/12* (2013.01); *C08G 2101/00* (2013.01); *C08G 2170/90* (2013.01)

(58) Field of Classification Search
CPC ........ C08G 18/10; C08G 18/48; C08G 18/42; C08L 75/08; C08L 75/06; B29D 35/14
See application file for complete search history.

(56) References Cited

U.S. PATENT DOCUMENTS

| | | | |
|---|---|---|---|
| 5,952,053 A | 9/1999 | Colby | |
| 6,423,755 B1* | 7/2002 | Allen | .................... C08G 18/12 |
| | | | 521/131 |
| 2006/0240193 A1* | 10/2006 | Failla | ................. C08G 18/4238 |
| | | | 427/372.2 |
| 2009/0275690 A1 | 11/2009 | Weaver et al. | |

FOREIGN PATENT DOCUMENTS

| | | |
|---|---|---|
| CN | 104066763 A | 9/2014 |
| CN | 105531296 A | 4/2016 |
| CN | 105683236 A | 4/2016 |
| WO | 2015/007731 A1 | 1/2015 |
| WO | 2015/062960 A1 | 5/2015 |

OTHER PUBLICATIONS

International Preliminary Report on Patentability from counterpart International Application No. PCT/US2018/056503 dated May 14, 2020.
First Office Action from corresponding Chinese International Patent Application 201880070213.8 dated Sep. 29, 2021, and its English translation.
Fu Mingyuan et al., "Polyurethane Elastomers and Application thereof", *Chemical Industrial Press*, pp. 333-334, and English translation of relevant paragaph between pp. 333 and 334.
International Search Report and Written Opinion from counterpart International Application No. PCT/US2018/056503 dated Jan. 22, 2019.
Cabot, CAB-O-SIL: Treated Fumed Silicas for Polvols Used in Polvurethanes, 2014.
First Examination Report from corresponding Indian Patent Application No. 202027020360 dated Nov. 15, 2021.
Office Action from corresponding Brazilian Patent Application No. BR 11 2020 008567-7 dated Jul. 12, 2022.

* cited by examiner

*Primary Examiner* — Michael L Leonard
(74) *Attorney, Agent, or Firm* — Grüneberg and Myers PLLC (57) ABSTRACT

Methods for forming elastomeric polyurethane articles are provided in which an isocyanate component including an isocyanate prepolymer is mixed with an isocyanate-reactive component having a viscosity ranging from 50,000 to 200,000 centipoise as measured by ASTM standard D2196, and wherein is applied as one or more layers onto a surface of a carrier substrate at an application rate ranging from 0.5 to 20 g/sec, with each one of said applied one or more layers independently having a thickness ranging from 0.2 and 10 millimeters and having a total thickness ranging from ranging from 0.2 to 60 millimeters. The applied layers are cured in the absence of added heat via an exothermic reaction to form the elastomeric polyurethane article having an abrasion resistance ranging from 20 to 250 $mm^3$, a hardness ranging from 60 Asker C to 90 Asker C, and a density ranging from 330 and 1000 $kg/m^3$.

13 Claims, 2 Drawing Sheets

METHODS AND COMPOSITIONS FOR FORMING ELASTOMERIC POLYURETHANE ARTICLES AND ASSOCIATED ELASTOMERIC POLYURETHANE ARTICLES FORMED THEREFROM

BACKGROUND OF THE INVENTION

1. Field of the Invention

The present invention generally relates to methods for producing elastomeric polyurethane articles associated elastomeric polyurethane articles formed therefrom.

2. Description of the Related Art

With the growing need for lightweight, high-performance structural materials, the search for materials having such attributes is ongoing. Owing to their broad property profile, polyurethanes are used nowadays in a multiplicity of applications, including the medical industry and consumer goods such as the footwear industry, and in particular high performance footwear products and customized articles. Conventional elastomeric polyurethanes are widely used in midsole, outsole, and unit soles for footwear products. Such footwear products are generally molded. However, conventional polyurethane products are designed to flow rapidly, and are therefore not suitable to be made without a mold. Further, the use of other conventional elastomeric polyurethanes require long cycling times, typically with a post curing step, to achieve desirable products. In the absence of long cycle times, such products may sag, or are sticky, and hence those skilled in the art are not able to apply such compositions as stacked layers. Further, conventional systems typically require added heat to be fully cured to form final products, which adds costs and processing time. Even still further, conventional polyurethane systems are not suitable for new processing technologies, such as 3D-writing, 3D micro-dispensing, or similar technologies that can create 3D articles.

The present invention relates to elastomeric polyurethane articles, and in particular elastomeric polyurethane useful as shoe components and protective layers that exhibit excellent abrasion resistance performance and provide benefits over rubber in terms of processing without a mold, as well as feasibility of processing automation.

SUMMARY OF THE INVENTION AND ADVANTAGES

The present invention provides methods for forming elastomeric polyurethane articles, and associated elastomeric polyurethane articles formed therefrom, that exhibit a combination of mechanical and physical properties as described below.

In one embodiment, a method for forming such elastomeric polyurethane articles comprises:
  providing an isocyanate component comprising an isocyanate prepolymer;
  forming an isocyanate-reactive component having a viscosity ranging from 50,000 to 200,000 centipoise, the isocyanate-reactive component comprising, based on 100 parts by weight of the isocyanate-reactive component:
    50 to 95 parts by weight of a hydroxyl-functional compound having an average hydroxyl functionality, per molecule, ranging from 2 to 2.4, wherein the hydroxyl-functional compound is selected from a hydroxyl-functional polyether, a hydroxyl-functional polyester, and combinations thereof,
    1 to 12 parts by weight of a chain extender,
    0 to 5 parts by weight of a cross-linker having an average of at least three active hydrogen atoms per molecule, and
    0.5 to 3 parts by weight of a catalyst;
  mixing the formed isocyanate-reactive component with the provided isocyanate component to form a mixture having an isocyanate index ranging from 85 to 105;
  applying one or more layers of the formed mixture at a viscosity ranging from 10,000 to 40,000 centipoise onto a surface of a carrier substrate at an application rate ranging from 0.5 to 20 g/sec, each one of said applied one or more layers independently having a thickness ranging from 0.2 and 10 millimeters; and
  curing each one of the applied one or more layers of the formed mixture to form the elastomeric polyurethane article, the elastomeric polyurethane article having a three-dimensional structure and having a thickness defined by the applied one or more layers ranging from 0.2 to 60 millimeters, an abrasion resistance ranging from 20 to 250 mm$^3$ as measured in accordance with DIN ISO 4649, a hardness ranging from 60 Asker C to 90 Asker C as measured on the Asker hardness scale in accordance with ASTM D2240, and a density ranging from 330 to 1000 kg/m$^3$ as measured in accordance with ASTM 1622;
  wherein the viscosities of the isocyanate reactive component and of the mixture are respectively measured in accordance with ASTM standard D2196 using an LV-04 (64) spindle on a Brookfield viscometer at 3 revolutions per minute and at 30 degrees Celsius.

In certain embodiments, the isocyanate component consists essentially of the isocyanate prepolymer.

The present invention also provides a composition for forming the elastomeric polyurethane articles including the isocyanate component and the isocyanate-reactive component as described above.

The balance of reactivity, viscosity and thixotropic characteristics of the formed mixture allows the mixture to be applied in thin layers by a wide variety of methods, including by being molded in thin layers, casted into any shape or size (including micro-casting), printed into lines such as by 3D printing, dispensed layer by layer, or sprayed onto molds. In addition, the catalyst included in the method is specially formulated to help generate more heat and cure the formed mixture in short periods of times, such as within minutes, without the need for added heat and without the need for post curing, thereby forming the elastomeric polyurethane articles. As such, the elastomeric polyurethane compositions are suitable for micro-dispensing (micro-casting) of article layout layer-by-layer continuously without waiting, and without spreading of the applied layers. As such, the formed elastomeric polyurethane articles keep their shape/width during the application process.

The elastomeric polyurethane articles, formed in accordance with the instant disclosure at the desired thickness and density, have excellent energy return properties, in addition to the high abrasion resistance and hardness properties as described above. In certain embodiments, elastomeric polyurethane articles formed in accordance with the present invention have a vertical rebound of 9 to 45% as measured in accordance with the method of ASTM D2632.

In addition, the elastomeric polyurethane articles formed in accordance with the methods of the present invention maintain these mechanical properties (i.e., abrasion resistance, hardness, flexibility, vertical rebound, etc.) even after heat and humidity aging, such as after two weeks of humidity aging at 70 degrees Celsius and 95% relative humidity.

Due to these properties, the elastomeric polyurethane articles are particularly suitable for footwear applications, including for use as outsoles in high performance footwear, but also find use in other applications where the unique combination of mechanical and physical properties are desirable.

DETAILED DESCRIPTION OF THE INVENTION

The present invention is directed towards methods and compositions for forming elastomeric polyurethane articles, including elastomeric polyurethane foam articles, having abrasion resistance in addition to other desirable mechanical and durability properties. The present invention is suitable for use with new application methods, including micro-drawing, micro-casting, and 3D application technology.

In accordance with one method of the present invention, the elastomeric polyurethane articles of the present invention are formed as the reaction product of a mixture of an isocyanate component and an isocyanate-reactive component (sometimes alternatively referred to as the resin component).

In certain embodiments, the elastomeric polyurethane articles are in the form of a compact elastomer, while in other embodiments the elastomeric polyurethane articles are in the form of a foam (i.e., are elastomeric foam polyurethane articles).

As will be described in further detail below, the balance of reactivity, viscosity and thixotropic characteristics of the formed mixture, including the attributes of the isocyanate component and isocyanate reactive component, allows the mixture to be applied in thin layers by a wide variety of methods, including by being molded in thin layers, casted into any shape or size (including microcasting), printed into lines such as by 3D printing, dispensed layer by layer, or sprayed onto molds to form three-dimensional structure. In addition, the catalyst included in the formation step of these elastomeric polyurethane articles is specially formulated to help generate heat and cure the articles in short periods of times, such as within minutes, without the need for added heat or a heated mold, and also without the need for post curing (although post curing is contemplated).

As provided herein, reference to the viscosity of the particular components used for forming of the elastomeric polyurethane articles of the present invention, or of mixtures of components of the present invention, refers to viscosities as measured at 30° C. in accordance with the method of ASTM standard D2196-15 on a Brookfield-type rotational viscometer, using the LV-04 (64) spindle at 3 revolutions per minute (RPM), with such measurements expressed in units as centipoise (cP, with one cP equal to one millipascal-second (mPa·s)).

As also provided herein, hardness, otherwise referred to as durometer hardness or Shore hardness, refers to hardness measurements expressed on the Asker hardness scale measured with a durometer in accordance with the procedure described in ASTM D2240.

As also provided herein, density of the polyurethane article of the present invention refers to densities measured in accordance with the procedure described in ASTM D1622.

Still further, the vertical rebound is measured in accordance with ASTM D2632 in terms of a percentage bounce-back.

A. Isocyanate Component

The isocyanate component of the present invention is an isocyanate-containing compound (i.e., an NCO group-containing compound) that reacts with hydroxyl groups from a hydroxyl-functional polymer (described below) to form carbamate (i.e., urethane) links. It is to be appreciated that the terminology "isocyanate component" as used herein, is not limited to monomeric isocyanate, i.e., the isocyanate component may comprise monomeric isocyanates and polymeric isocyanates. In addition, the terminology "isocyanate component" as used herein, encompasses isocyanate-functional prepolymers. Said differently, isocyanate-functional prepolymers, e.g., hydroxyl-functional polymers reacted with an excess of an isocyanate-containing compound, may be utilized as the isocyanate component in the present invention.

1. Isocyanates (Excluding Isocyanate Prepolymers)

Suitable isocyanates (excluding isocyanate-functional prepolymers, described below) for use as the isocyanate-containing compound in the isocyanate component comprise the aliphatic, cycloaliphatic and aromatic di- or poly-functional isocyanates known from the prior art and any desired mixtures thereof. Examples of suitable isocyanates include methylene diphenyl diisocyanate (also sometimes referred to as diphenylmethane diisocyanate, MDI, or monomeric MDI), tetramethylene diisocyanate, hexamethylene diisocyanate (HDI), isophorone diisocyanate (IPDI), tolylene 2,4- or 2,6-diisocyanate (TDI) and combinations thereof. MDI exists in three isomers (2,2'-MDI, 2,4'-MDI, and 4,4'-MDI) however, the 4,4' isomer (sometimes referred to as Pure MDI) is most widely used. For the purposes of the subject disclosure, the term "MDI" refers to all three isomers unless otherwise noted.

Typically, the isocyanate for use as the isocyanate-containing compound in the isocyanate component comprises polymeric diphenylmethane diisocyanate (PMDI). PMDI is typically present in the isocyanate component to provide reactive groups, i.e., NCO groups, during a flexible polyurethane foaming reaction, as set forth in more detail below. PMDI is typically a mixture of oligomeric diphenylmethane diisocyanates, i.e., a mixture of MDI and its dimer and/or trimer. PMDI comprises a crude MDI having three or more benzene rings including NCO groups. PMDI is typically obtained through the condensation of aniline and formaldehyde in the presence of an acid catalyst, followed by phosgenation and distillation of a resulting polymeric amine mixture. PMDI is typically present in the isocyanate component in an amount of from about 1 to about 30, more typically from about 5 to about 25, even more typically from about 8 to about 12 parts by weight based on 100 parts by weight of the isocyanate component

2. Isocyanate Prepolymers

As noted above, the isocyanate component also encompasses isocyanate prepolymers, otherwise referred to isocyanate-terminated prepolymers. The isocyanate prepolymer, when consisting essentially of or otherwise present in the isocyanate component, are obtainable by reacting the NCO-functional groups of an isocyanate component with an active hydrogen-containing species (typically hydroxyl-functional polymers), for example at temperatures of from 30 to 100° C., preferably at about 80° C., to give the isocyanate-terminated prepolymer having free isocyanate functional groups that are reactive with the hydroxyl groups of hydroxyl functional polymers to form carbamate (i.e., urethane) linkages.

The isocyanate component of the isocyanate terminated prepolymer includes any of the suitable isocyanates described above. In certain embodiments, the isocyanate component of the isocyanate-terminated prepolymer is selected from the group of MDI, PMDI, and combinations thereof. In certain embodiments, the isocyanate-terminated prepolymer comprises a blend of PMDI and quasi-prepolymers of 4,4'MDI.

The isocyanate-reactive component used for forming the isocyanate-terminated prepolymer is preferably a polymer that includes one or more hydroxyl groups (OH-functional groups), or more commonly referred to as a hydroxyl-functional polymer and sometimes alternatively and generally referred to simply as a polyol (wherein the polyol also encompasses monols or may otherwise include monols). The isocyanate component is a polymer that includes one or more isocyanate groups (NCO groups) that react with the hydroxyl groups to form carbamate (i.e., urethane) links.

In certain embodiments, the hydroxyl-functional polymer is a hydroxyl-functional polyester (i.e., hydroxyl-functional polyester-group containing polymers), while in other embodiments the hydroxyl-functional polymer is a hydroxyl-functional polyether (i.e., hydroxyl-functional polyether-group containing polymers. In yet other embodiments, the isocyanate-reactive component hydroxyl-functional polymer can be a mixture of one or more hydroxyl-functional polyesters and one or more hydroxyl-functional polyethers.

Suitable hydroxyl-functional polyesters for use in the ester-based isocyanate-terminated prepolymers can be prepared, for example, from organic dicarboxylic acids having from 2 to 12 carbon atoms, preferably dicarboxylic acids having from 4 to 6 carbon atoms, and polyhydric alcohols, preferably diols, having from 2 to 12 carbon atoms, preferably 2 to 6 carbon atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. It is also possible to use the corresponding carboxylic acid derivatives, e.g. dicarboxylic esters of alcohols having from 1 to 4 carbon atoms or dicarboxylic anhydrides, instead of the free dicarboxylic acids. Preference is given to using dicarboxylic acid mixtures of succinic, glutaric and adipic acid in weight ratios of, for example, 20-35:35-50:20-32, and in particular adipic acid. Examples of dihydric and polyhydric alcohols, in particular diols, are: ethanediol, di-ethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, glycerol, 1,5-pentanediol and 1,6-hexanediol. It is also possible to use polyester polyols derived from lactones, e.g. ε-caprolactone, or hydroxycarboxylic acids, e.g. ω-hydroxycaproic acid.

Particularly suitable commercially available isocyanate-terminated prepolymers formed as the reaction product of the isocyanate component and a hydroxyl-functional polyester include Elastopan 41640T and 41490T, each available from BASF Corporation of Florham Park, New Jersey.

Ether-based isocyanate-functional prepolymers are preferably obtained by reacting the isocyanate component as described above, particularly preferably 4,4'-MDI, with a suitable hydroxyl-functional polyether.

The hydroxyl-functional polyether used as one of the reactants are polyether polymers that include one or more hydroxyl-functional groups, typically at least two OH-functional groups. Accordingly, the hydroxyl-functional polyether are polyether polymers having one OH-functional group (i.e., a polyether monol), two OH-functional groups (i.e., a polyether diol), three OH-functional groups (i.e., a polyether triol), four OH-functional groups (i.e., a polyether tetrol), polyether-group containing polymers having more than four OH-functional groups, and combinations thereof. The hydroxyl functionality of these hydroxyl-functional polyethers is typically expressed in terms of an average functionality of all of the respective polymer chains present in the collective hydroxyl-functional polyether blend.

Hydroxyl-functional polyethers having an average of two or more OH-functional groups per molecule are sometimes alternatively referred to as polyether polyols, which are typically formed as the polymeric reaction product of an organic oxide and an initiator compound containing two or more active hydrogen atoms. The active hydrogen compound in the presence of a base catalyst initiates ring opening and oxide addition, which is continued until the desired molecular weight is obtained. If the initiator has two active hydrogens, a diol results. If a trifunctional initiator such as glycerine is used, the oxide addition produce chain growth in three directions, and a triol results.

The hydroxyl-functional polyether can be any type of hydroxyl-functional polyether known in the art. The hydroxyl-functional polyether can be non-ethoxylated or ethoxylated. In addition, the hydroxyl-functional polyether can be short chain, low molecular weight hydroxyl-functional polyether having one or more OH-functional groups. Particularly suitable hydroxyl-functional polyether or polyethers for use in the polyurethanes include, but are not limited to, products obtained by the polymerization of a cyclic oxide, for example ethylene oxide (EO), propylene oxide (PO), butylene oxide (BO), or tetrahydrofuran in the presence of initiator compounds having one or more active hydrogen atoms. Suitable initiator compounds including a plurality of active hydrogen atoms for use in obtaining hydroxyl-functional polyethers include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable hydroxyl-functional polyether or polyethers include polyether diols and triols, such as polyoxypropylene diols and triols and poly(oxyethylene-oxypropylene)diols and triols obtained by the simultaneous or sequential addition of ethylene and propylene oxides to di- or tri-functional initiators. Copolymers having oxyethylene contents ranging from about 5 to about 90% by weight, based on the weight of the polyether polyol component, of which the polyether polyols may be block copolymers, random/block copolymers or random copolymers, can also be used. Yet other suitable hydroxyl-functional polyethers include polytetramethylene ether glycols obtained by the polymerization of tetrahydrofuran.

Particularly suitable hydroxyl-functional polyether or polyethers for use include those based on a totally heteric (or random) EO (ethylene oxide), PO (propylene oxide) structure, or those having heteric, but uniform blocks of EO and PO, e.g. blocks comprising EO and blocks comprising PO. As yet another suitable example, the hydroxyl-functional polyether can have heteric blocks and uniform blocks of EO and PO, e.g. blocks comprising all EO or PO and blocks comprising random EO, PO. Still further, in certain examples, the hydroxyl-functional polyether can be heteric or random copolymers of EO and PO which are endblocked with either EO or PO. One particularly suitable hydroxyl-functional polyether comprises a polyether-triol having ethylene-oxide terminal groups.

In certain of these embodiments, the hydroxyl-functional polyether or polyethers for use in forming the isocyanate-terminated prepolymers of the subject disclosure have a weight average molecular weight (Mw) ranging from 60 to 10,000, such as 180 to 6,500, g/mol, as measured by gel permeation chromatography (GPC) or nuclear magnetic resonance (NMR) previously calibrated using a calibration curve based on mono-dispersed polystyrene standards.

In certain embodiments, a combination of two or more hydroxyl-functional polyethers for use in forming the isocyanate-terminated prepolymers of the subject disclosure can be used, with each one of the two or more hydroxyl-functional polyethers having the same or a different weight average molecular weight within the range of 60 to 10,000, such as 180 to 6,500, g/mol described above.

B. Isocyanate Reactive Component

As noted above, the elastomeric polyurethane article of the present invention also includes an isocyanate reactive component.

In order to form elastomeric polyurethane articles in accordance with the present invention, the isocyanate component and the isocyanate-reactive component are reacted at an isocyanate index of greater than or equal to about 85 and less than or equal to about 105, such as between 90 and 105. The term "isocyanate index" is defined as the ratio of NCO groups in the isocyanate component to hydroxyl groups in the isocyanate-reactive component multiplied by 100.

Further, in certain embodiments, in order to match processing characteristics and to provide the proper application viscosity for applying the mixture of the isocyanate component and the isocyanate-reactive component to form the elastomeric polyurethane article of the present invention, the viscosity of the isocyanate-reactive component ranges from 50,000 to 200,000 centipoise, such as from 60,000 to 180,000 centipoise, most preferably from 80,000 to 160,000 centipoise, with such viscosities measured in accordance with ASTM standard D2196 using an LV-04 (64) spindle on a Brookfield viscometer at 3 revolutions per minute and at 30 degrees Celsius.

In certain embodiments, the application viscosity of the mixture of the isocyanate component and the isocyanate reactive component (using the isocyanate-reactive component having a viscosity of from 50,000 to 200,000 centipoise), ranges from 10,000 to 40,000 centipoise, such as from 20,000 to 30,000 centipoise, with such viscosities measured immediately after mixing and in accordance with ASTM standard D2196 using an LV-04 (64) spindle on a Brookfield viscometer at 3 revolutions per minute and at 30 degrees Celsius.

1. Hydroxyl Functional Polymer

In certain embodiments, the isocyanate-reactive component comprises a hydroxyl-functional polymer, which includes hydroxyl functional groups that are reactive with the isocyanate-functional groups of the isocyanate component to form carbamate (i.e., urethane) linkages, and hence form the elastomeric polyurethane articles. It is to be appreciated that the isocyanate-reactive component can include one or more hydroxyl-functional polymers. Typically, the isocyanate-reactive component includes a combination of hydroxyl-functional polymers. The hydroxyl-functional polymers includes one or more OH functional groups, typically at least two OH functional groups.

The hydroxyl-functional polymer typically includes a conventional hydroxyl-functional polymer, such as hydroxyl-functional polyesters and/or a hydroxyl-functional polyethers and described above with respect to the isocyanate prepolymer. Other suitable hydroxyl-functional polymers include, but are not limited to, biopolyols, such as soybean oil, castor-oil, soy-protein, rapeseed oil, etc., and combinations thereof.

Suitable hydroxyl-functional polyesters and/or hydroxyl-functional polyethers include those as described above for forming the isocyanate-terminated prepolymers, which are herein incorporated by reference and not repeated for brevity.

In certain embodiments, the hydroxyl functional component comprises from 50 to 95 parts by weight, based on 100 parts by weight, of the isocyanate-reactive component. Further, in combination therewith, the average hydroxyl functionality, per molecule, of the hydroxyl-functional compound ranges from 2 to 2.4, such at 2.0 to 2.3, such as from 2.0 to 2.2.

2. Chain Extender

The isocyanate-reactive component also comprises one or more chain extenders. Chain extenders are substances having a molecular weight of preferably less than 500 g/mol, particularly preferably from 60 to 400 g/mol.

In certain embodiments, the chain extenders are present in the isocyanate-reactive component in an amount ranging from 1 to 12 parts by weight, based on 100 parts by weight of the isocyanate-reactive component.

Suitable chain extenders are materials having two active hydrogen atoms which are reactive towards the isocyanate-functional groups of the isocyanate component.

Suitable chain extenders with two active hydrogen atoms for use in the isocyanate-reactive component have weight average molecular weights of preferably less than 500 g/mol, such as from 60 to 400 g/mol.

Suitable chain extenders include aliphatic, cycloaliphatic, and/or araliphatic diols having from 2 to 14, preferably from 2 to 10, carbon atoms, e.g. ethylene glycol; 1,2-propanediol; 1,3-propanediol; 1-5 pentanediol; 1,6-hexanediol; 1,10-decanediol; 1,2-dihydroxycyclohexane; 1,3-dihydroxycyclohexane; 1,4-dihydroxycyclohexane; diethylene glycol; 1,4-butanediol; 1,6-hexanediol; bis(2-hydroxy-ethyl) hydroquinone; dipropylene glycol; or any mixture thereof. Particularly suitable chain extenders include monoethylene glycol and 1,4 butanediol or mixtures thereof.

3. Cross-Linking Agent (Cross-Linker)

The isocyanate-reactive component also typically comprises one or more cross-linking agents, or cross-linkers. As opposed to the chain extenders described above, suitable cross-linkers have, on average, more than two active hydrogen atoms per molecule, such as three active hydrogen atoms, which are reactive towards the isocyanate-functional groups of the isocyanate component.

When utilized in the isocyanate-reactive component, the cross-linker generally allows phase separation between copolymer segments of the formed polyurethane. That is, the formed polyurethane typically comprises both rigid urea copolymer segments and soft polyol copolymer segments. The cross-linkers typically chemically and physically links the rigid urea copolymer segments to the soft polyol copolymer segments. Therefore, the cross-linker is typically present in the isocyanate-reactive component to modify the hardness, increase stability, and reduce shrinkage of the formed polyurethane.

Suitable non-limiting examples of cross-linkers for use in the isocyanate-reactive component of the subject disclosure include glycerin (i.e. glycerol), diethanolamine (DEOA), and triethanolamine (TEOA).

When present, the one or more crosslinkers are present in an amount ranging from greater than 0 to 3 parts by weight, based upon 100 parts by weight of the isocyanate-reactive component.

4. Catalyst

The isocyanate reactive component also includes a catalyst present in the isocyanate-reactive component which catalyzes the reaction between the isocyanate-functional groups of the isocyanate component and the hydroxyl-functional groups of the isocyanate-reactive component of the present invention. It is to be appreciated that the catalyst is typically not consumed in the exothermic reaction between the isocyanate component and the hydroxyl-functional polymer component. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc.

The catalysts, or combination of catalysts, are added in an amount of from 0.001 to 6 parts by weight, more preferably 0.5 to 3 parts by weight, based upon 100 parts by weight of the isocyanate-reactive component.

As catalysts for producing the elastomeric polyurethane, preference is given to using compounds which strongly accelerate the reaction of the hydroxyl functional polymers, the chain extenders and the optional cross-linkers with the isocyanate-functional groups of the isocyanate component.

Exemplary catalysts include amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediam ine, N,N, N',N'-tetramethylbutanediamine, N,N,N',N'-tetramethylhexanediamine, pentamethyldiethylenetriamine, bis (dimethylaminoethyl) ether, bis(dimethylaminopropyl)urea, dimethylpiperazine, 1,2-dimethylimidazole, 1-azabicyclo [3.3.0]octane and preferably 1,4-diazabicyclo[2.2.2]octane and alkanolamine compounds such as triethanolamine, triisopropanolamine, N-methyl-diethanolamine and N-ethyldiethanolamine and dimethylethanolamine.

Further possibilities for catalysts are organic metal compounds (i.e., organometallics), preferably organic tin compounds such as tin(II) salts of organic carboxylic acids, e.g. tin(II) acetate, tin(II) octoate, tin(II) ethylhexano-ate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate, or mixtures thereof.

Still further catalysts include amine catalysts, which are a class of organic compounds derived from ammonia ($NH_3$) by substituting one or more of the hydrogen atoms with alkyl groups (carbon and hydrogen containing molecular chains)—e.g., dimethylcyclohexylamine $[(CH_3)_2NC_6H_{11}]$. An amine is primary, secondary, or tertiary depending on whether one, two, or three of the hydrogen atoms of ammonia are replaced. Most amines are basic and can combine readily with acids to form salts, some of which are useful as delayed-action catalysts. Catalytic activity of tertiary amines depends on their structure and basicity.

The amines and the organometallics have been found most useful in the manufacture of the elastomeric polyurethane articles of the present invention. Amine combinations are selectively used in order to establish an optimum balance between, reactivity, flow ability and viscosity buildup, and assuring "cure" (i.e., completeness of reaction) without external heat added, if desired, and thus allows the elastomeric polyurethane compositions of the present invention to be ambiently cured.

The organic metal compounds can be used either alone or preferably in combination with strongly basic amines. If the hydroxyl-functional polymer is an ester (i.e., is a hydroxyl-functional polyester), preference is given to using exclusively amine catalysts.

In certain embodiments, the catalysts are a blend of catalysts introduced at from 0.001 to 6 parts by weight, such as from 0.5 to 3 parts by weight, based on the 100 parts by weight of the isocyanate-reactive component, that play a critical role to control and assure the curing of the elastomeric polyurethane article. Suitable blends of catalysts include at least one of each type of catalyst selected from "Catalyst 1" and "Catalyst 2" below:

Catalyst 1: tertiary amine, imidazole, including: triethylenediamine (TEDA), TEDA; Trade Names DABCO Crystal; RC Catalyst 105; JEFFCAT TD-100, LUPRAGEN N 203 (BASF), DABCO-33LV, DABCO® EG Catalyst, LUPRAGEN N 202 (BASF), DABCO S-25 (Evonics): JEFFCAT® TD-33A Amine Catalyst, Dabco® 33LV Catalyst Niax® Catalyst A-33.

Catalyst 2: all types of catalyst for polyurethane, different from Catalyst 1, such as: POLYCAT DBU; RC Catalyst 6180, delayed action amine catalysts, DABCO® 8154, DABCO 1027, DABCO 1028.

5. Surfactants

The isocyanate-reactive component also optionally includes one or more surfactants (i.e., surface-active substances). The surfactant typically supports aid homogenization of the starting materials for the isocyanate-reactive component and also aids in the homogenization of a blowing agent and the hydroxyl-functional polymer component and regulates a cell structure when the resultant elastomeric material is formed as a foam. The surfactant may include any suitable surfactant or mixtures of surfactants known in the art.

Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxane-oxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One non-limiting example of a surfactant is a silicone glycol copolymer, while other suitable surfactants particularly used in foamed applications include organopolysiloxanes as products available under the trade name Dabco® 193, available from Air Products or Tegostab® B8905, available from Evonik.

The surfactants, when present, are usually employed in amounts of from 0.3 to 3 parts by weight, preferably from 0.5 to 2 parts by weight and most preferably from 0.8 to 1.5 parts by weight, based on 100 parts by weight of isocyanate reactive component.

6. Thixotropic Agents

The isocyanate-reactive component also optionally includes one or more thixotropic agents.

Suitable thixotropic agents, otherwise referred to as rheology modifiers and/or thickeners, are included as solids or liquids that function to create a thixotropic flow behavior and are used for rheology control in the isocyanate-reactive component or, as noted below, in the mixture including the isocyanate-reactive component and the isocyanate component. At high sheer, the rheology modifier and/or thickener is included in the isocyanate-reactive component, or is including in the mixture including the isocyanate component, to create highly thixotropic flow behavior and improve the anti-sagging properties. Notably, the thixotropic agents according to the present invention have little or no effect on cure time for the elastomeric polyurethane article.

Suitable solids include fumed silica or amide wax such as those sold under trade name CAB-O-SIL® including CAB-O-SIL TS-530, CAB-O-SIL TS-610, CAB-O-SIL M-5 fumed and CAB-O-SIL TS 720 TS-720. Suitable liquid thixotropic agents include products sold under the trade name BYK, including BYK-405, BYK 410, BYK-7410 ET, BYK-7411 ES, BYK-7420 ES, BYK-R 605.

If utilized, the thixotropic agents are present in amounts ranging from greater than 0 to 8 parts by weight, such as from 0.2 to 6 parts by weight, such as 1 to 3.5 parts by weight, based on 100 parts by weight of isocyanate reactive component.

In alternative embodiments, the thixotropic agent (including rheology modifiers and/or thickeners) may alternatively be included on the isocyanate side (i.e., as a part of the isocyanate component described above), in the same relative amounts as described above.

In still further embodiments, the thixotropic agents (including rheology modifiers and/or thickeners) may be introduced in a slurry of thickener using a hydroxyl-functional polymer (such as described above) or a partial resin component (including the hydroxyl-functional polymer and additional other components described herein included on the isocyanate-reactive component side) and added as a separate component (i.e. a third stream) in addition to the isocyanate component and isocyanate-reactive component when forming the elastomeric polyurethane articles of the present invention.

In certain embodiments, it is necessary to include two or more different thixotropic agents (such as two or more rheology modifiers, two or more thickeners, or a combination thereof) to provide the desired thixotropic behavior to the isocyanate-reactive component, or to the mixture including both the isocyanate-reactive component and the isocyanate component.

7. Molecular Sieve Powder

The isocyanate-reactive component also optionally includes a molecular sieve powder that functions as a desiccant in the isocyanate-reactive component. One suitable molecular sieve powder is Molecular Sieve 3A powder.

If utilized, the molecular sieve powder is present in amounts ranging from greater than 0 to 3 parts by weight, such as from 0.5 to 2.0 parts by weight, such as from 0.5 to 1 part by weight, based on 100 parts by weight of isocyanate reactive component.

8. Additional Additives

The isocyanate-reactive component may optionally include one or more additives in addition to those described above. Suitable additives for purposes of the present invention include, but are not limited to, processing additives, adhesion promoters, anti-oxidants, ultraviolet light stabilizers, fillers, silicones, colorants/pigments, and combinations thereof. If included, the additive can be included in the isocyanate-reactive component in various amounts.

If utilized, any one or more of the additional additives are present in amounts ranging from greater than 0 to 4 parts by weight, such as from 0 to 2 parts by weight, based on 100 parts by weight of isocyanate reactive component.

Elastomeric Polyurethane Foam Article

In certain embodiments, the elastomeric polyurethane article of the subject disclosure is in the form of a foam, wherein the isocyanate component and the isocyanate-reactive component are reacted in the presence of a blowing agent to form the elastomeric polyurethane foamed article. The blowing agent may be a physical blowing agent, a chemical blowing agent, or a combination of a physical blowing agent and chemical blowing agent that is added to the isocyanate component side or the isocyanate-reactive component side, or both the isocyanate component side or the isocyanate-reactive component side, of the composition used to form the elastomeric polyurethane foamed article.

The terminology "physical blowing agent" refers to blowing agents that do not chemically react with the isocyanate component and/or the isocyanate-reactive component. The physical blowing agent can be a gas or liquid. The liquid physical blowing agent typically evaporates into a gas when heated, and typically returns to a liquid when cooled.

In certain embodiments, the physical blowing agent can also be a gas that is trapped within a polyurethane elastomer shell, wherein the gas expands under heat which causes the shell to grow. In certain embodiments, the physical blowing agent may be introduced via a masterbatch containing both the physical blowing agent and a polymer matrix composition such as ethylene vinyl acetate (EVA), or is simply admixed with the remainder of the components used in forming the elastomeric polyurethane foamed article.

The liquid physical blowing agent, in certain embodiments, evaporates into a gas when heated, and typically returns to a liquid when cooled. In certain embodiments, the liquid physical blowing agent is a liquefied gas such as liquefied carbon dioxide or liquid nitrogen.

The terminology "chemical blowing agent" refers to blowing agents which chemically react with the isocyanate or with other components to release a gas for foaming. One specific, non-limiting example of a chemical blowing agent is water. Other non-limiting examples of chemical blowing agents include citric acid or hydrogen carbonate which can also create carbon dioxide.

The blowing agent is typically present in the isocyanate-reactive component for forming the elastomeric polyurethane foamed article in an amount ranging from about 0.06 to about 2 parts by weight, such as from 0.1 to 0.5 parts by weight, based on 100 parts by weight of total hydroxyl-functional polymer present in the isocyanate-reactive component used for forming the elastomeric polyurethane foamed article.

Method for Forming the Elastomeric Polyurethane Article

The present invention also describes an associated method for forming the elastomeric polyurethane article and elastomeric polyurethane foamed article.

In either method, the isocyanate component and the isocyanate-reactive component (or the first and second isocyanate-reactive components) are reacted at an isocyanate index of greater than or equal to about 85 and less than or equal to 105, more preferably from 90 to 105. The term "isocyanate index" is defined as the ratio of NCO groups in the isocyanate component to hydroxyl groups in the isocyanate-reactive component multiplied by 100.

The elastomeric polyurethane article of the present invention may be produced by mixing the isocyanate component and the isocyanate-reactive component to form a mixture at room temperature or at slightly elevated temperatures, e.g., 15 to 30° C., wherein the isocyanate component and the isocyanate-reactive component react via an exothermic reaction in the absence of added heat. It certain embodiments in which the elastomeric polyurethane article is produced in a mold, it is to be appreciated that the isocyanate component and the isocyanate-reactive component may be mixed to form the mixture prior to disposing the mixture in the mold. For example, the mixture may be poured into an open mold or the mixture may be injected into a closed mold. Alternatively, the isocyanate component and the isocyanate-reactive component may be mixed to form the mixture within the mold. In these embodiments, upon completion of the polyurethane foaming reaction, the polyurethane foam takes the shape of the mold.

More specifically, the method for forming the elastomeric polyurethane articles includes the steps of: (1) providing or otherwise forming the isocyanate component (including an isocyanate prepolymer); (2) forming the isocyanate-reactive component including each of the components as described above at a viscosity ranging from 50,000 to 200,000 centipoise; (3) mixing the isocyanate component and the isocyanate-reactive component to form a mixture, with the mixture having a viscosity 10,000 to 40,000 centipoise; and (4) applying one or more layers of the formed mixture onto a carrier; and (5) curing each one of the one or more applied layers in the absence of added heat to form the elastomeric polyurethane article.

In certain embodiments, as noted above, the relative amounts of the isocyanate component and the isocyanate-reactive component are included such that the isocyanate component and the isocyanate-reactive component are reacted at an isocyanate index of greater than or equal to 85 to less than or equal to 105.

In certain embodiments, the one or more applied layers from step (4) have a thickness (i.e., an overall thickness or cumulative thickness) from 0.2 to 60 millimeters, such as from 0.2 to 40 millimeters.

In certain embodiments, the step of applying one or more layers of the formed mixture onto a carrier (4) comprises: (a) applying a first layer of the formed mixture onto a surface of a carrier substrate at an application rate ranging from 0.5 to 20 g/sec and at a thickness ranging from 0.2 and 10 millimeters, and (b) consecutively applying one or more additional layers of the formed mixture onto said applied first layer at an application rate ranging from 0.5 to 20 g/sec to form a multi-layer structure comprising the elastomeric polyurethane article, each of the applied one or more additional layers having a thickness ranging from 0.2 and 10 millimeters, wherein each one of the consecutively applied one or more additional layers is applied onto the applied first layer without waiting or stopping or delay (such as within two minutes) after said step of applying of the first layer. If desired, the subsequently applied layer is applied to the previously applied layer while the previously applied layer is still at least tacky to the touch (i.e., is not a tack free layer—as described below). In certain embodiments, the viscosity of the previously applied layer is still within the application range of 10,000 to 40,000 centipoise.

In other embodiments, the step of applying one or more layers of the formed mixture onto a carrier (4) comprises: (a) applying a first layer of the formed mixture onto a surface of a carrier substrate at an application rate ranging from 0.5 to 20 g/sec and at a thickness ranging from 0.2 and 10 millimeters, and (b) consecutively applying one or more additional layers of the formed mixture onto said applied first layer at an application rate ranging from 0.5 to 20 g/sec to form a multi-layer structure comprising the elastomeric polyurethane article, each of the applied one or more additional layers having a thickness ranging from 0.2 and 10 millimeters, wherein each one of the consecutively applied one or more additional layers is applied onto a previously applied layer prior to the previously applied layer curing to a tack free state (see the definition of tack free as provided in the examples below). In certain embodiments, the viscosity of the previously applied layer is still within the application range of 10,000 to 40,000 centipoise.

In further embodiments, each one of the consecutively applied one or more additional layers has the same thickness as the applied first layer. The "same thickness", as defined herein, refers to each one of the consecutively applied one or more layers having thicknesses within 0.1 millimeters of the thickness of the applied first layer. Accordingly, for example, if the applied first layer has a thickness of 1.0 millimeters, each subsequently applied one or layers may have an applied thickness varying between 0.9 and 1.1 millimeters.

In other embodiments, at least one of the consecutively applied one or more additional layers may have a different thickness than the applied first layer. The "different thickness", as defined herein, refers to at least one of the consecutively applied one or more layers having a respective thickness greater than 0.1 millimeters different than the applied first layer. Accordingly, for example, if the applied first layer has a thickness of 1.0 millimeters, at least one of the consecutively applied one or more additional layers has a thickness of less than 0.9 millimeters, or greater than 1.1 millimeters. Such a change in thickness may be accomplished by adjusting the throughput for application of the mixture.

In still further embodiments, at least one of the consecutively applied one or more additional layers may have a different thickness than another one of the consecutively applied one or more additional layers. The "different thickness", as defined herein, refers to at least one of the consecutively applied one or more layers having a respective thickness greater than 0.1 millimeters different than the one of the other consecutively applied other layers. Accordingly, for example, if the applied first layer has a thickness of 1.0 millimeters, at least one of the consecutively applied one or more additional layers has a thickness of less than 0.9 millimeters, or greater than 1.1 millimeters, and fall within the definition of "different thickness" as defined herein.

Surprisingly, it has been found that formulations according to the present invention are particularly useful in 3D-printing processes; for example, but not limited to, "direct ink writing". The technical concept of the invention allows to adjust key processing parameters in a very wide range. Such requirements comprise flow properties (rheology), curing kinetics, flexibility in controlling the ratio of two or more component feeds to the mixer, independent dosing of additives or pigments. These parameters can be adjusted and optimized for process robustness and performance of 3D-printed materials. In this way, 3D-printing can be performed with high resolution, good layer-to-layer adhesion resulting in isotropic material properties, excellent surface quality and the like. And in consequence, manufacturing of final parts for fully functional use becomes possible matching stringent physical requirements, like mechanical strength or softness, abrasion resistance, resilience or rebounce performance of materials as well as esthetic and/or haptic properties, glossy or matt surfaces, soft-touch or rigidity, durability and coloration. Whilst the achievements of the present invention may have general importance for industrial manufacturing processes, they have particular significance for 3D-printing. High precision and complexity of geometries, variability of product properties, ability to create gradients in density and/or mechanical properties (e.g. stiffness, elasticity, surface hardness, etc.) within one-and-the-same printed part, are outstanding features which can only achieved by 3D-printing and, most specifically, by applying the findings of the present invention. Property adjustment and ability for individualization of 3D-printed parts according to the present invention enable step changes in future manufacturing technologies of polyurethane articles.

The elastomeric polyurethane articles, formed in accordance with the instant disclosure at the desired thickness and density, have excellent energy return properties, in addition to the high abrasion resistance and hardness.

In certain embodiments, the elastomeric polyurethane articles, including the elastomeric foam polyurethane articles, have a density ranging from 330 to 1000 kg/m$^3$, such as from 400 to 950 kg/m$^3$, such as from 530 to 900 kg/m$^3$, with such densities measured in accordance with ASTM D1622.

In further embodiments, the elastomeric polyurethane articles, including the elastomeric foam polyurethane articles, have a hardness of from 60 Asker C to 90 Asker C (corresponding to about 40 Shore A to 70 Shore A), such as from 70 Asker C to 85 Asker C, as measured on the Asker hardness scale in accordance with ASTM D2240.

In further embodiments, the elastomeric polyurethane articles, including the elastomeric foam polyurethane articles, have an abrasion resistance of from 20 to 250 mm$^3$, such as 25 to 150 mm$^3$, such as from 30 to 80 mm$^3$ as measured in accordance with DIN ISO 4649.

In certain embodiments, elastomeric polyurethane articles formed in accordance with the present invention has a vertical rebound, as measured in accordance with ASTM D2632, of from 9 to 45%.

In further embodiments, the elastomeric polyurethane articles, and elastomeric foamed polyurethane articles, formed in accordance with the present invention have any combination of two or more of these properties (density, hardness, abrasion resistance, and vertical rebound).

In addition, the elastomeric polyurethane articles formed in accordance with the methods of the present invention maintain these mechanical properties (i.e., abrasion resistance, hardness, flexibility, energy absorption, etc.) even after heat and humidity aging, such as after two weeks of humidity aging at 70 degrees Celsius and 95% relative humidity.

Due to these properties, the elastomeric polyurethane articles are particularly suitable for footwear applications, including for use as outsoles or other shoe components (protective layer, reinforcement, etc.) in high performance footwear, but also find use in other applications where the unique combination of mechanical and physical properties are desirable, including for example clothing applications, medical applications (prosthetics), automotive applications, window frames, and the like.

Accordingly, due to the balance of reactivity, viscosity and thixotropic characteristics of the formed mixture allows the mixture to be applied in thin layers by a wide variety of methods, including by being molded in thin layers, casted into any shape or size (including micro-casting), printed into lines such as by 3D printing, dispensed layer by layer, or sprayed onto molds. In addition, the catalyst included in the method is specially formulated to help generate heat and cure the formed mixture in short periods of times, such as within minutes, without the need for added heat and without the need for post curing, thereby forming the elastomeric polyurethane articles. As such, the elastomeric polyurethane compositions are suitable for micro-dispensing (micro-casting) of article layout layer-by-layer continuously without waiting, and without spreading of the applied layers. As such, the formed elastomeric polyurethane articles keep their shape/width during the application process. Such a combination of properties and application advantages are not found in known processes for forming elastomeric polyurethane articles, which require longer cycling times and post cure to form articles having similar mechanical properties.

Stated another way, the process and composition for forming the elastomeric polyurethane articles of the present invention offers at least the following advantages over known methods and polyurethane systems as follows: (1) the elastomeric polyurethane compositions of the present invention are suitable for micro-dispensing (micro-casting) of article layout layer-by-layer; (2) the elastomeric polyurethane compositions of the present invention are ready to stack layers continuously without waiting (no spreading, keep the shape/width, and finish in few minutes (4-5 minutes depending upon the design); (3) the elastomeric polyurethane compositions of the present invention are self-cured, (exothermal) vs. heat-cure characteristics (involving heating mold to cure); and (4) the use of other polyurethane systems does not result in acceptable cycling time (sagging, sticky, not be able to stack layers) and needs post cure.

The following examples are intended to illustrate the invention and are not to be viewed in any way as limiting to the scope of the invention.

Examples

Elastomeric polyurethane articles were prepared in accordance with the present invention and subsequently evaluated for various physical properties.

Sample Evaluation Procedure

Part A: Formation of Isocyanate Reactive Component and Evaluation of Viscosity; Formation of Polyurethane Composition Polyurethane compositions in accordance with the present invention, described and illustrated as Examples 1-8 in Table 1 below, were prepared for evaluation according to the following procedure. First, each of the liquid components of the resin portion of the composition (i.e. the Polyols (i.e., hydroxyl-functional polymers), chain extender, catalyst, stabilizers, water, and colorant) were introduced to a standard or high speed mixer and mixed to form a mixture. Rheology modifiers/thickeners (i.e., thixotropic agents) were then added to this mixture and the mixture was mixed in a high speed mixer at 1,000-2,600 revolutions per minute for a sufficient time, from 5-30 minutes, to ensure a homogeneous mixture.

TABLE 1

Formulation of Polyurethane Foam Composition

| Examples | Example 1 | Example 2 | Example 3 | Example 4 |
|---|---|---|---|---|
| Polyol 1[1] | 76.72 | 89.20 | — | — |
| Polyol 2[2] | 12.53 | — | — | — |
| Polyol 3[3] | — | — | 89.00 | 61.66 |
| Polyol 4[4] | — | — | — | 26.96 |
| Chain extender[5] | 4.53 | 5.45 | 5.05 | 4.25 |
| Catalyst 1[6] | 0.82 | 0.90 | 0.70 | 0.68 |
| Catalyst 2[7] | 0.60 | 0.30 | 0.60 | 0.80 |
| Stabilizers[8] | 1.00 | 1.00 | 0.50 | 1.00 |
| Water | 0.15 | 0.15 | 0.15 | 0.15 |
| Rheology modifiers/thickeners[9] | 2.65 | 3.00 | 3.00 | 3.00 |
| Colorant[10] | 1.000 | — | 1.300 | 1.500 |
| Total Resin Weight | 100.000 | 100.000 | 100.000 | 100.000 |
| Isocyanate Prepolymer[11] (Amount added to give Isocyanate Index of 100) | 63.61 | 69.02 | 66.54 | 61.95 |

| Examples | Example 5 | Example 6 | Example 7 | Example 8 |
|---|---|---|---|---|
| Polyol 1[1] | 76.74 | 88.22 | — | — |
| Polyol 2[2] | 12.53 | — | — | — |
| Polyol 3[3] | — | — | 88.35 | 78.43 |
| Polyol 4[4] | — | — | — | 11.00 |
| Chain extender[5] | 4.53 | 5.45 | 5.05 | 4.25 |
| Catalyst 1[6] | 0.82 | 1.20 | 1.32 | 0.68 |
| Catalyst 2[7] | 0.60 | 0.30 | 0.48 | 0.96 |
| Stabilizers[8] | 1.00 | 1.00 | 0.50 | 1.00 |
| Water | 0.13 | 0.15 | 0.20 | 0.18 |
| Rheology modifiers/thickeners[9] | 2.65 | 3.00 | 3.10 | 3.00 |
| Colorant[10] | 1.000 | — | 1.000 | 1.000 |
| Total Resin Weight | 100.000 | 100.000 | 100.000 | 100.000 |
| Isocyanate Prepolymer[11] (Amount added to give Isocyanate Index of 100) | 63.12 | 70.25 | 70.07 | 63.39 |

[1]Polyol 1: Lupraphen 6601, polyester based polyol commercially available from BASF Corporation of Florham Park, New Jersey.
[2]Polyol 2: HOOPOL PM-245, polymeric polyol commercially available from Synthesia Internacional S.L.U. of Barcelona, Spain.
[3]Polyol 3: Lupraphen 5626, polyether based polyol commercially available from BASF Corporation of Florham Park, New Jersey.
[4]Polyol 4: HOOPOL PM-445, polyester based polyol commercially available from Synthesia Internacional S.L.U. of Barcelona, Spain.
[5]Chain Extender—monoethylene glycol
[6]Catalyst 1—Lupragen N 203—commercially available from BASF Corporation of Florham Park, New Jersey.
[7]Catalyst 2—Dabco 1027 commercially available from Evonik Industries.
[8]Stabilizer—Elastostab ® H01 commercially available from BASF Corporation of Florham Park, New Jersey.
[9]Rheology Modifier/Thickener—CAB-O-SIL TS 720.
[10]Colorant—commercially available from Repi,
[11]Isocyanate Prepolymer—Elastopan 41640T, NCO content 18.7%, commercially available from BASF Corporation of Florham Park, New Jersey.

The mixtures of Examples 1-8, prior to the addition of the isocyanate prepolymer, were measured for viscosity on a Brookfield Viscometer DV2T at 30 degrees Celsius according to the following procedure (which corresponds to ASTM D2186) with the results listed in Table 2 below:

1. Turn on the viscometer using the switch on the back.
2. Remove the guard leg attachment and remove the spindle keeping in mind the spindle loosens when turned to the right/counter-clockwise (opposite of a normal screw).
3. Check the viscometer is level by making sure the bubble is in the center of the circle; adjust the feet on the instrument if necessary.
4. Tap next on the Auto Zero screen and next again after the Auto Zero process is complete.
5. Attach the LV-04 (64) spindle to the viscometer. The spindle will have the number 64 etched onto the tightening nut.
6. On the Configure Test screen, select the correct spindle and choose the speed you want to rotate the spindle at.
7. Lower the spindle into the sample, using the rotating handle on the right side of the instrument, until the depth marker around the narrow section of the spindle is just above the surface of the sample.
8. Tap the run button and wait a few minutes for the spindle to reach the same temperature as the sample before recording the viscosity and torque. If the sample is too viscous for the speed you are using, the torque and viscosity fields will display EEEEE. If this happens, use a slower speed/smaller spindle.
9. Stop the test and do not save the results, make sure you write them down first.
10. Repeat this process for all the speeds you wish to measure viscosity at.
11. When you are done with a sample, remove the spindle and gently clean it making sure you do not bend it.
12. Place the spindle back in its case when you are done, turn off the viscometer and reattach the guard leg.

TABLE 2

Viscosity of Resin Components

| | Example 1 | | Example 2 | | Example 3 | | Example 4 | |
|---|---|---|---|---|---|---|---|---|
| | Torque | Viscosity (cP) | Torque | Viscosity (cP) | Torque | Viscosity (cP) | Torque | Viscosity (cP) |
| 10 RPM | 77% | 49,000 | 74% | 45,000 | N/A | N/A | N/A | N/A |
| 5 RPM | 68% | 83,000 | 54% | 66,000 | 95% | 114,000 | N/A | N/A |
| 3 RPM | 54% | 108,000 | 48% | 96,000 | 63% | 125,000 | 63% | 125,000 |
| 2 RPM | 48% | 142,000 | 42% | 127,000 | 55% | 169,000 | 56% | 167,000 |
| 1 RPM | 40% | 241,000 | 36% | 219,000 | 48% | 289,000 | 49% | 293,000 |

| | Example 5 | | Example 6 | | Example 7 | | Example 8 | |
|---|---|---|---|---|---|---|---|---|
| | Torque | Viscosity (cP) | Torque | Viscosity (cP) | Torque | Viscosity (cP) | Torque | Viscosity (cP) |
| 10 RPM | 78% | 47,000 | N/A | N/A | N/A | N/A | N/A | N/A |
| 5 RPM | 61% | 73,000 | N/A | N/A | 86% | 104,000 | 89% | 107,000 |
| 3 RPM | 57% | 115,000 | 92% | 185,000 | 75% | 151,000 | 79% | 158,000 |
| 2 RPM | 47% | 140,000 | 87% | 257,000 | 68% | 203,000 | 71% | 215,000 |
| 1 RPM | 40% | 234,000 | 77.60% | 463,000 | 59% | 353,000 | 63% | 377,000 |

Part B: Temperature Profile Evaluation of Polyurethane Compositions

In Part B, the isocyanate prepolymer was mixed with the resin component of Examples 1-8 (as shown in Table 1 above) at ambient temperatures (i.e., without added heat). The mixture began reacting at ambient temperatures (i.e., without added heat) to form the polyurethane composition in accordance with the present invention. A temperature profile (illustrated in FIGS. 1 and 2) was created for each of Examples 1-8 during the formation process in accordance with the following procedure:

Temperature Profile Measurement Method
1. Spray a thermometer with mold release. We used a Fluke 52 K/J Thermometer with a Teflon coated thermocouple.
2. Attach the thermocouple to an adjustable clamp and support stand so that it can easily be lowered into a 600 mL plastic beaker.
3. Using a total mixture mass of 200 g, make a foam by mixing the isocyanate prepolymer and resin component for 5 seconds at 2,600 RPM. If the resin is too viscous, it may be necessary to fold the isocyanate prepolymer into the resin with a large spatula before using the mixing station.
4. Quickly bring the beaker to the stand and lower the thermocouple into the mixture before it begins to gel. Make sure not to leave it touching the walls or bottom of the cup.
5. Record the temperature every 10 seconds for the first 400 seconds, or until you notice a significant decrease in the rate at which the temperature changes, then record the temperature every 30 seconds.
6. Once the test is over (usually about 1000 seconds), remove and clean the thermocouple.

Figure 1:
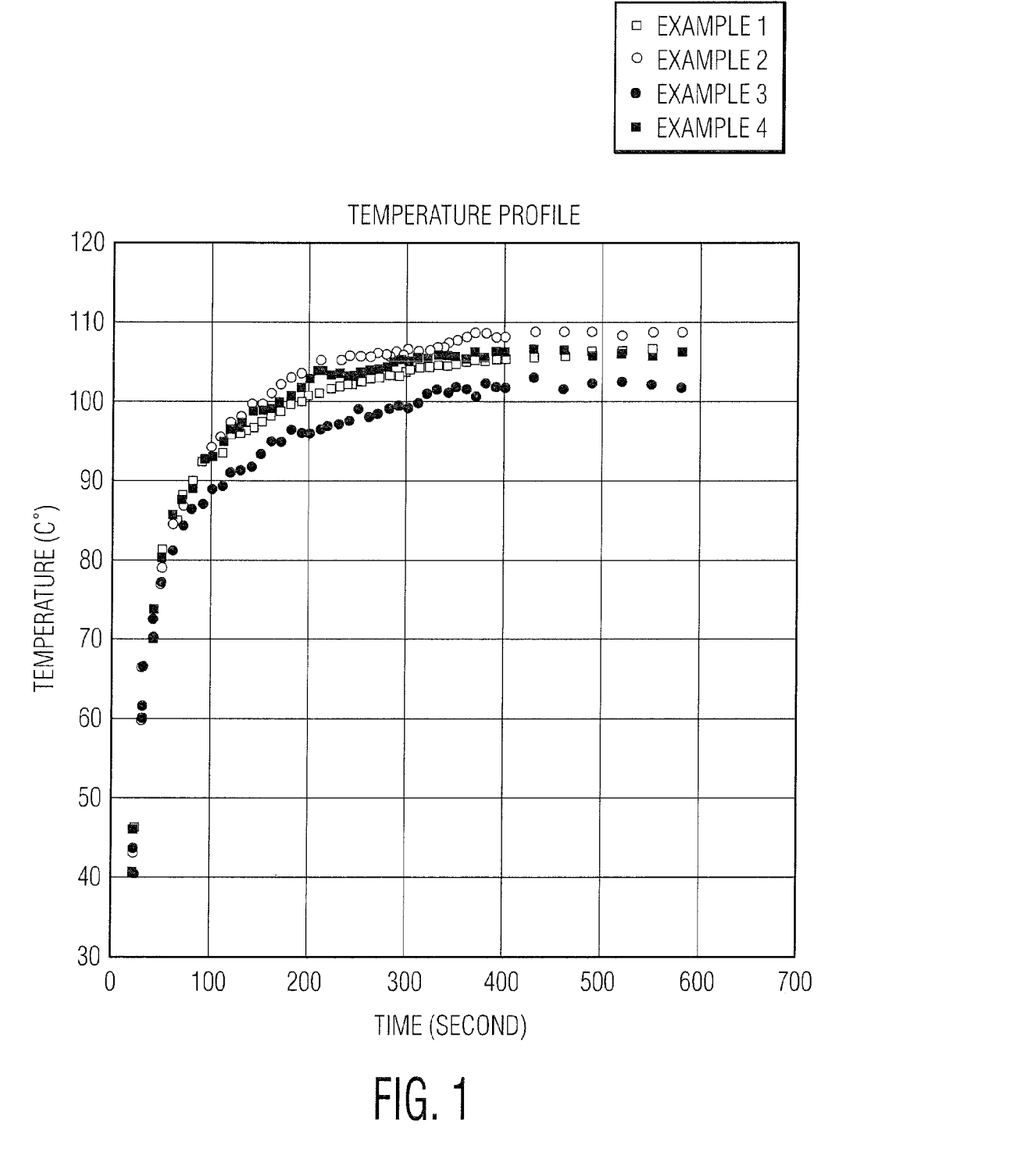
FIG. 1 is temperature profile graph for Examples 1-4 comparing the temperature increase of the mixture of the isocyanate component and the isocyanate component over time.
Figure 2:
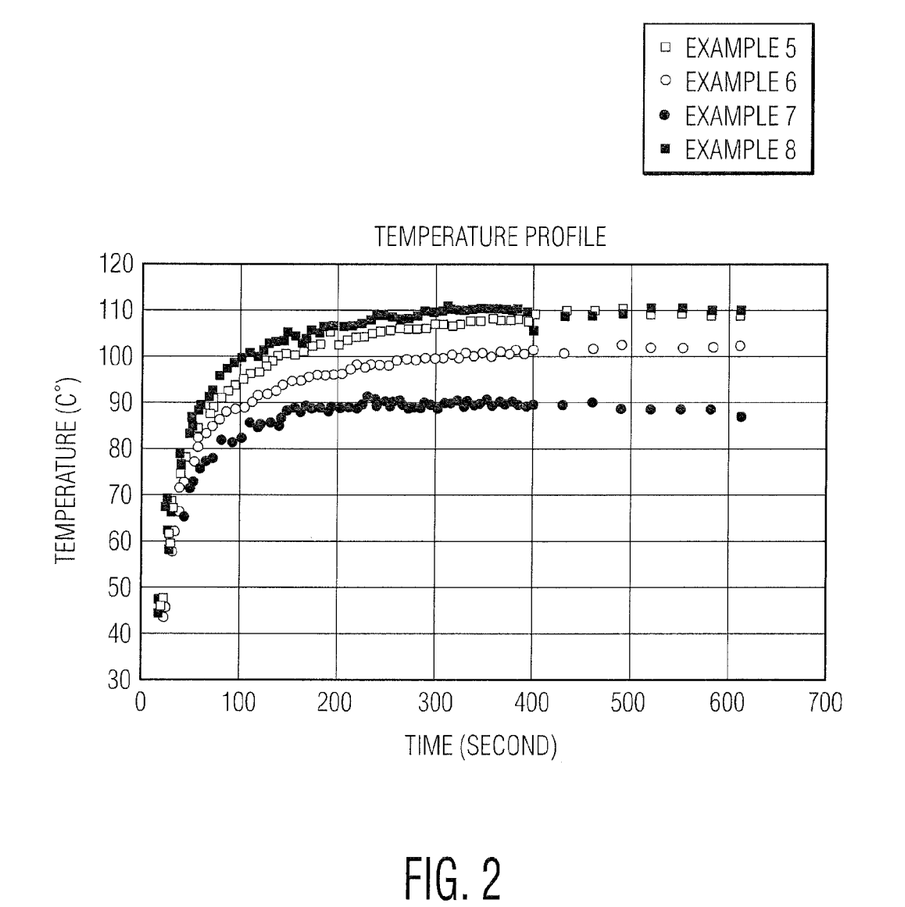
FIG. 2 is temperature profile graph for Examples 5-8 comparing the temperature increase of the mixture of the isocyanate component and the isocyanate component over time.

FIGS. 1 and 2 confirm that for each of the Examples 1-8, a substantial increase in temperature was observed within the first minute of mixing the isocyanate component with the isocyanate-reactive component, and thereinafter the temperatures leveled off. This experiment, done in the absence of added heat, confirms the exothermic reaction (i.e., self-curing reaction) of the isocyanate component and the isocyanate-reactive component to form an elastomeric polyurethane article.

Part C: Evaluation of Polyurethane Articles for Various Physical Properties

In Part C, samples of Examples 1-8 were evaluated for various physical properties, including tack free time, hardness (Asker C) hardness, density and vertical rebound according to the following procedures:

Using a drill press/handmix, a 200 gram mixture of each of Examples 1-8 was prepared (i.e., by mixing the isocyanate component and the isocyanate-reactive component) and quickly poured into respective two metal, circular molds each having a volume of approximately 45 milliliters and a thickness of about 1 inch (25.4 centimeters). A tongue depressor was pressed onto the top surface of the mixture of one of the molds at light pressure to determine when the molded part was sufficiently cured to resist deformation. This is referred to as the tack free time, and is measured in seconds as illustrated below in Table 3.

After tack free time was achieved, and the time recorded, the second samples were then measured for hardness (i.e., durometer hardness) in accordance with ASTM 2240 (DIN 53505) on the Asker Hardness scale, for density in accordance with ASTM D1622 (DIN 53479), and for vertical rebound in accordance with ASTM D2632 measured as a percentage of an amount of bounceback of a ball dropped from a predetermined height as provided in the standard. The results are shown in Tables 3 and 4 below:

TABLE 3

Comparison of Tack Free Time and Hardness

|  | Example 1 | Example 2 | Example 3 | Example 4 |
|---|---|---|---|---|
| Tack Free Time (seconds) | 66 | 95 | 65 | 66 |
| Hardness (Asker C) | | | | |
| 2 min | 13 ± 2 | N/A | 10 ± 2 | 15 ± 2 |
| 3 min | 22 ± 2 | 20 ± 2 | 19 ± 2 | 21 ± 2 |
| 4 min | 27 ± 2 | 25 ± 2 | 30 ± 3 | 30 ± 3 |
| 5 min | 37 ± 3 | 32 ± 3 | 36 ± 3 | 40 ± 5 |
| 6 min | 39 ± 3 | 38 ± 3 | 47 ± 3 | 46 ± 2 |
| 9 min | 40 ± 2 | 41 ± 1 | 52 ± 1 | 50 ± 1 |
| 15 min | 45 ± 2 | 48 ± 2 | 55 ± 2 | 54 ± 2 |

TABLE 4

Comparison of Density, Hardness and Vertical Rebound

|  | Example 1 | Example 2 | Example 3 | Example 4 |
|---|---|---|---|---|
| Density (kg/m$^3$) | 700 ± 20 | 620 ± 20 | 550 ± 20 | 540 ± 20 |
| Hardness (Asker C) | 76 ± 2 | 68 ± 2 | 74 ± 2 | 73 ± 2 |
| Vertical Rebound (%) | 30 ± 2 | 27 ± 2 | 31 ± 2 | 14 ± 2 |

|  | Example 5 | Example 6 | Example 7 | Example 8 |
|---|---|---|---|---|
| Density (kg/m$^3$) | 730 ± 20 | 590 ± 30 | 530 ± 30 | 800 ± 30 |
| Hardness (Asker C) | 80 ± 2 | 81 ± 2 | 77 ± 2 | 75 ± 2 |
| Vertical Rebound (%) | 10 ± 2 | 13 ± 2 | 12 ± 2 | 9 ± 2 |

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "ranging from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange ranging from at least 10 to 35, a subrange ranging from at least 10 to 25, a subrange ranging from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "ranging from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A method for forming an elastomeric polyurethane article, said method comprising:
   providing an isocyanate component comprising an isocyanate prepolymer;
   forming an isocyanate-reactive component having a viscosity ranging from 50,000 to 200,000 centipoise, the isocyanate-reactive component comprising, based on 100 parts by weight of the isocyanate-reactive component:
      50 to 95 parts by weight of a hydroxyl-functional compound having an average hydroxyl functionality, per molecule, ranging from 2 to 2.4, wherein the hydroxyl-functional compound is selected from a hydroxyl-functional polyether, a hydroxyl-functional polyester, and combinations thereof,
      1 to 12 parts by weight of a chain extender,
      0 to 5 parts by weight of a cross-linker having an average of at least three active hydrogen atoms per molecule, and
      0.5 to 3 parts by weight of a catalyst;
   mixing the formed isocyanate-reactive component with the provided isocyanate component to form a mixture having an isocyanate index ranging from 85 to 105;
   applying one or more layers of the formed mixture at a viscosity ranging from 10,000 to 40,000 centipoise onto a surface of a carrier substrate at an application rate ranging from 0.5 to 20 g/sec, each one of said applied one or more layers independently having a thickness ranging from 0.2 and 10 millimeters; and
   curing each one of the applied one or more layers of the formed mixture to form the elastomeric polyurethane article, the elastomeric polyurethane article having a three-dimensional structure and having a thickness defined by the applied one or more layers ranging from 0.2 to 60 millimeters, an abrasion resistance ranging from 20 to 250 mm$^3$ as measured in accordance with DIN ISO 4649, a hardness ranging from 60 Asker C to 90 Asker C as measured on the Asker hardness scale in accordance with ASTM D2240, and a density ranging from 330 and 1000 kg/m³ as measured in accordance with ASTM 1622;

wherein the viscosities of the isocyanate reactive component and of the mixture are respectively measured in accordance with ASTM standard D2196 using an LV-04 (64) spindle on a Brookfield viscometer at 3 revolutions per minute and at 30 degrees Celsius.

2. The method of claim 1, wherein the isocyanate component consists essentially of the isocyanate prepolymer.

3. The method of claim 1, wherein said step of curing comprises:

curing each one of the applied one or more layers of the formed mixture in the absence of added heat within two minutes after said step of applying one or more layers of the formed mixture to form the elastomeric polyurethane article.

4. The method of claim 1, wherein said step of applying one or more layers of the formed mixture comprises:

applying a first layer of the formed mixture onto a surface of a carrier substrate at an application rate ranging from 0.5 to 20 g/sec and at a thickness ranging from 0.2 and 10 millimeters, and consecutively applying one or more additional layers of the formed mixture onto said applied first layer at an application rate ranging from 0.5 to 20 g/sec to form a multi-layer structure comprising the elastomeric polyurethane article, each of the applied one or more additional layers having a thickness ranging from 0.2 and 10 millimeters, wherein each one of the consecutively applied one or more additional layers is applied onto the applied first layer within two minutes after said step of applying of the first layer.

5. The method of claim 1, wherein said step of applying one or more layers of the formed mixture comprises:

applying a first layer of the formed mixture onto a surface of a carrier substrate at an application rate ranging from 0.5 to 20 g/sec and at a thickness ranging from 0.2 and 10 millimeters, and consecutively applying one or more additional layers of the formed mixture onto the applied first layer at an application rate ranging from 0.5 to 20 g/sec to form the elastomeric polyurethane article, each of the consecutively applied one or more additional layers having a thickness ranging from 0.2 and 10 millimeters, wherein each one of the consecutively applied one or more additional layers is applied onto a previously applied layer while an applied viscosity of the previously applied layer is between 10,000 and 40,000 centipoise.

6. The method of claim 4, wherein each one of the consecutively applied one or more additional layers has the same thickness as the applied first layer.

7. The method of claim 4, wherein at least one of the consecutively applied one or more additional layers has a different thickness from the applied first layer.

8. The method of claim 4, wherein at least one of the consecutively applied one or more additional layers has a different thickness from another one of the consecutively applied one or more additional layers.

9. The method of claim 1, wherein said step of curing each one of the applied one or more layers of the formed mixture in the absence of added heat to form the elastomeric polyurethane article comprises curing each one of the applied one or more layers of the formed mixture at ambient temperature to form the elastomeric polyurethane article.

10. The method of claim 1, wherein the elastomeric polyurethane article has vertical rebound of from 9 to 45% as measured in accordance with ASTM D2632.

11. The method of claim 1, wherein the cross-linker is present in an amount of greater than 0 to 5 parts by weight based on 100 parts of the isocyanate reactive component.

12. The method of claim 1, wherein the step of curing is done in the absence of added heat.

13. The method of claim 1, further comprising introducing a blowing agent prior to the step of applying the mixture, and wherein the formed elastomeric polyurethane article is a formed elastomeric foamed polyurethane article.

* * * * *